US008799122B1

(12) United States Patent
Del Favero et al.

(10) Patent No.: US 8,799,122 B1
(45) Date of Patent: Aug. 5, 2014

(54) METHOD AND SYSTEM FOR USER CONTRIBUTED AGGREGATED FRAUD IDENTIFICATION

(75) Inventors: James R. Del Favero, Redwood City, CA (US); Marko Rukonic, San Jose, CA (US)

(73) Assignee: Intuit Inc., Mountain View, CA (US)

( * ) Notice: Subject to any disclaimer, the term of this patent is extended or adjusted under 35 U.S.C. 154(b) by 860 days.

(21) Appl. No.: 12/060,092

(22) Filed: Mar. 31, 2008

(51) Int. Cl.
*G06Q 40/00* (2012.01)

(52) U.S. Cl.
USPC .............................................. 705/35; 705/39

(58) Field of Classification Search
USPC .......................................................... 705/35
See application file for complete search history.

(56) References Cited

U.S. PATENT DOCUMENTS

| | | | | |
|---|---|---|---|---|
| 7,440,915 | B1 * | 10/2008 | Ulrich | 705/35 |
| 2003/0097330 | A1 * | 5/2003 | Hillmer et al. | 705/38 |
| 2005/0276401 | A1 * | 12/2005 | Madill et al. | 379/114.14 |
| 2007/0256033 | A1 * | 11/2007 | Hiler | 715/860 |
| 2008/0172316 | A1 * | 7/2008 | Adams | 705/35 |

* cited by examiner

*Primary Examiner* — Bruce I Ebersman
*Assistant Examiner* — John Anderson
(74) *Attorney, Agent, or Firm* — Osha Liang LLP

(57) ABSTRACT

A method for identifying an origin of fraudulent activity including receiving a first affirmative fraud flag from a first user for a financial transaction associated with a first user account and obtaining financial transaction information for the first user account, which includes a first financial transaction entry listing a payee and a first time. The method further includes receiving a second affirmative fraudulent flag from a second user corresponding to a financial transaction and a second user account and obtaining financial transaction information for the second user account, which includes a second financial transaction entry listing the payee and a second time. The method further includes determining an intersection between the first and the second financial transaction entries, identifying a potential origin of fraud from the intersection, and alerting the first and the second user of the potential origin of fraud.

9 Claims, 9 Drawing Sheets

METHOD AND SYSTEM FOR USER CONTRIBUTED AGGREGATED FRAUD IDENTIFICATION

BACKGROUND

In general, financial accounting applications assist users in tracking financial transactions. The financial transactions typically span multiple financial accounts. For example, a user may have a credit card account, a banking account, a savings account, and/or another account used to track financial transactions.

Often times, a user will review previous financial transactions using a financial accounting application to ensure that no fraudulent charges have been made on their account. While it is typically easy for a user to identify a fraudulent financial transaction within their own account, it may be difficult for the user to identify the origin of the fraud. For example, if the user's account information (e.g., their credit card information) was stolen during a previous financial transaction (e.g., by a cashier processing the previous financial transaction), the user may not be able to determine the time and location where the account information was stolen. Further, it often difficult or impossible to warn others who may have had their account information taken at the same time and/or same location.

SUMMARY

In general, in one aspect, the invention relates to a method for identifying an origin of fraudulent activity, comprising receiving a first affirmative fraud flag from a first user for at least one financial transaction associated with a first user account, obtaining financial transaction information for the first user account comprising a first set of financial transaction entries, wherein a first financial transaction entry in the first set of financial transaction entries comprises a payee and a first time, storing the financial transaction information associated with the first user account in a financial transaction table, receiving a second affirmative fraudulent flag from a second user corresponding to at least one financial transaction and a second user account, obtaining financial transaction information for the second user account comprising a second set of financial transaction entries, wherein a second financial transaction entry in the second set of financial transaction entries comprises the payee and a second time, storing financial transaction information associated with the second user account in the financial transaction table, determining an intersection between the first and the second financial transaction entries, identifying a potential origin of fraud from the intersection, wherein the potential origin of fraud comprises the payee, and alerting the first and the second user of the potential origin of fraud.

In general, in one aspect, the invention relates to a method for identifying an origin of fraudulent activity, comprising receiving financial transaction information associated with a user wherein the financial transaction information comprises a payee, obtaining a stored fraud score for the payee from a fraud aggregation table, obtaining a fraud score threshold associated with the payee, identifying the payee as a potential origin of fraud when the stored fraud score exceeds the fraud score threshold, and alerting the user of the potential origin of fraud.

In general, in one aspect, the invention relates to a system, comprising a fraud detection engine, configured to receive a first affirmative fraud flag from a first user for at least one financial transaction associated with a first user account, obtain financial transaction information for the first user account comprising a first set of financial transaction entries, wherein a first financial transaction entry in the first set of financial transaction entries comprises a payee and a first time, store the financial transaction information associated with the first user account in a financial transaction table, receive a second affirmative fraudulent flag from a second user corresponding to at least one financial transaction and a second user account, obtain financial transaction information for the second user account comprising a second set of financial transaction entries, wherein a second financial transaction entry in the second set of financial transaction entries comprises the payee and a second time, store financial transaction information associated with the second user account in the financial transaction table, determine an intersection between the first and the second financial transaction entries, identify a potential origin of fraud from the intersection, wherein the potential origin of fraud comprises the payee and wherein an entry specifying the payee is stored in a fraud alert table, and alert the first and the second user of the potential origin of fraud, and a data store, wherein the data store comprises the financial transaction table, and the fraud alert table.

In general, in one aspect, the invention relates to a computer readable medium comprising executable instructions for performing a method, the method comprising receiving a first affirmative fraud flag from a first user for at least one financial transaction associated with a first user account, obtaining financial transaction information for the first user account comprising a first set of financial transaction entries, wherein a first financial transaction entry in the first set of financial transaction entries comprises a payee and a first time, storing the financial transaction information associated with the first user account in a financial transaction table, receiving a second affirmative fraudulent flag from a second user corresponding to at least one financial transaction and a second user account, obtaining financial transaction information for the second user account comprising a second set of financial transaction entries, wherein a second financial transaction entry in the second set of financial transaction entries comprises the payee and a second time, storing financial transaction information associated with the second user account in the financial transaction table, determining an intersection between the first and the second financial transaction entries, identifying a potential origin of fraud from the intersection, wherein the potential origin of fraud comprises the payee, and alerting the first and the second user of the potential origin of fraud.

In general, in one aspect, the invention relates to a computer readable medium comprising executable instructions for performing a method, the method comprising receiving financial transaction information associated with a user wherein the financial transaction information comprises a payee, obtaining a stored fraud score for the payee from a fraud aggregation table, obtaining a fraud score threshold associated with the payee, identifying the payee as a potential origin of fraud when the stored fraud score exceeds the fraud score threshold, and alerting the user of the potential origin of fraud.

Other aspects of the invention will be apparent from the following description and the appended claims.

DETAILED DESCRIPTION

Figure 1:
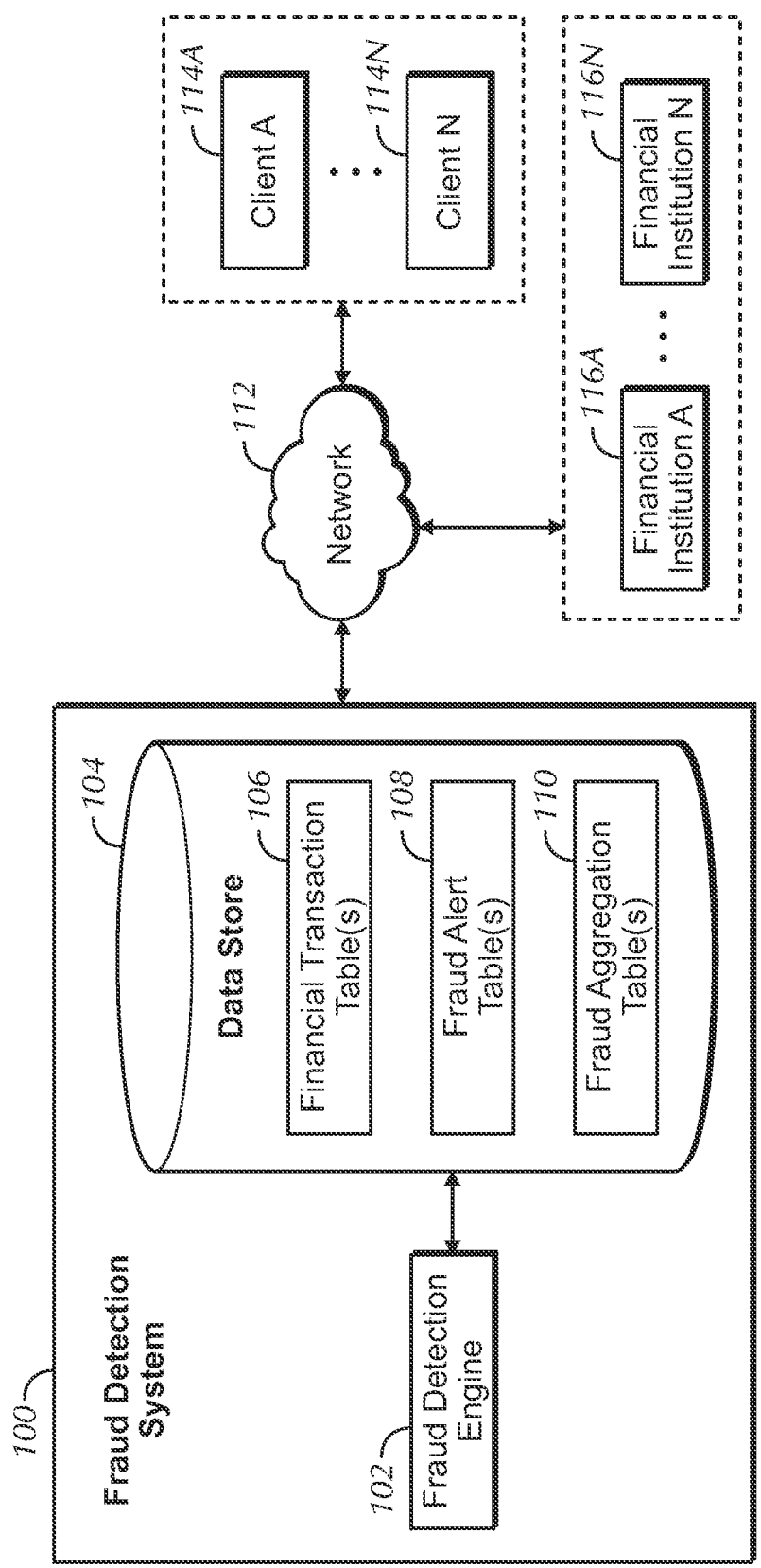
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system to identify a potential origin of fraud. More specifically, embodiments of the invention use a fraud detection system to analyze a set of financial transactions from multiple users to determine a potential origin of fraud. According to one or more embodiments of the invention, after determining a potential origin of fraud, the fraud detection system alerts users who may be affected by the potential origin of fraud.

FIG. 1 shows a system in accordance with one or more embodiments of the invention. The system includes a fraud detection system (100). The fraud detection system includes a fraud detection engine (102) and a data store (104). The data store (104) is configured to hold data regarding user financial transaction information. The data store (104) may be implemented using any form of persistent data storage (e.g., optical disks, magnetic media, and flash memory). In one embodiment of the invention, the data regarding financial transactions is stored in a series of tables, including a financial transaction table (106), a fraud alert table (108), and a fraud aggregation table (110).

In one embodiment of the invention, the financial transaction table (106) is configured to hold financial transaction information for users. More specifically, the financial transaction table (106) is configured to store information regarding the user, the payee, the date of the financial transaction, the amount of the financial transaction, and/or any additional information related to the financial transaction. Those skilled in the art will appreciate that financial transaction information may include some or all of the aforementioned information. In addition, financial transaction information may include more detailed transaction information, as is provided by a financial institution (116A, 116N). In one embodiment of the invention, the fraud alert table (108) is configured to hold information regarding potential origins of fraud. In one embodiment of the invention, the fraud aggregation table (110) is configured to store a fraud score for one or more payees.

In one embodiment of the invention, the fraud detection engine (102) is configured to use information from the financial transaction table (106) to populate the fraud alert table (108) and the fraud aggregation table (110). The fraud detection system (100) is operatively connected to a network (112). The fraud detection system (100) communicates over the network with clients (114A, 114N) and/or financial institutions (116A, 116N) to obtain user financial transaction information for one or more users.

In one embodiment of the invention, the network (112) may be a wide area network (WAN), such as the Internet, or a local area network (LAN). Further, the network (112) may be a wired network, a wireless network, or a combination thereof. In one embodiment of the invention, the financial institution (116A, 116N) corresponds to any entity providing financial services to users. Examples of financial institutions include, but are not limited to, banks and credit card companies. Examples of financial services include, but are not limited to, maintaining one or more accounts for a users and tracking financial transactions associated with each of the accounts. In one embodiment, the client (114A, 114N) corresponds to any device configured to communicate with the fraud detection system (100) over the network (112). Examples of clients include, but are not limited to, desktop computers, laptop computers, personal digital assistants (PDAs), and mobile phones.

Figure 2A:
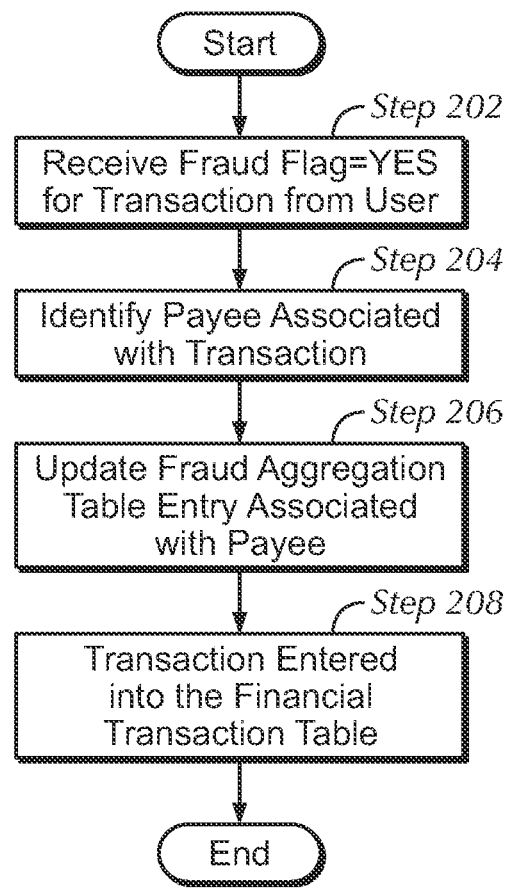
FIGS. 2A-2C show flow charts detailing a method of identifying an origin of fraud in accordance with one or more embodiments of the invention.
Figure 2B:
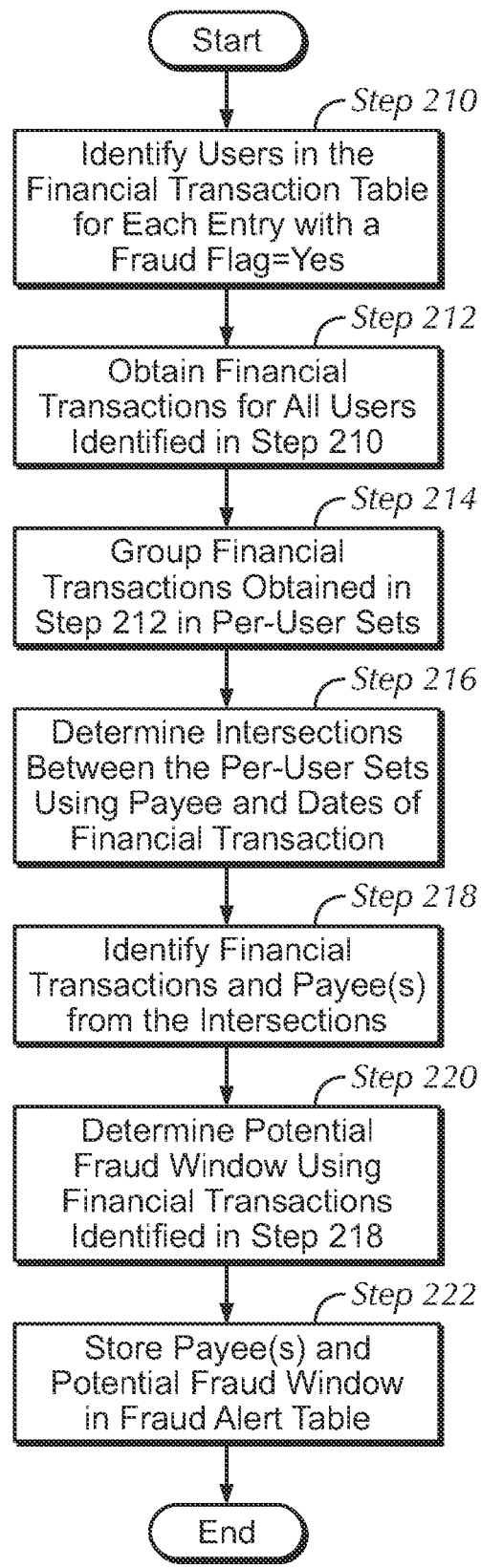
Figure 2C:
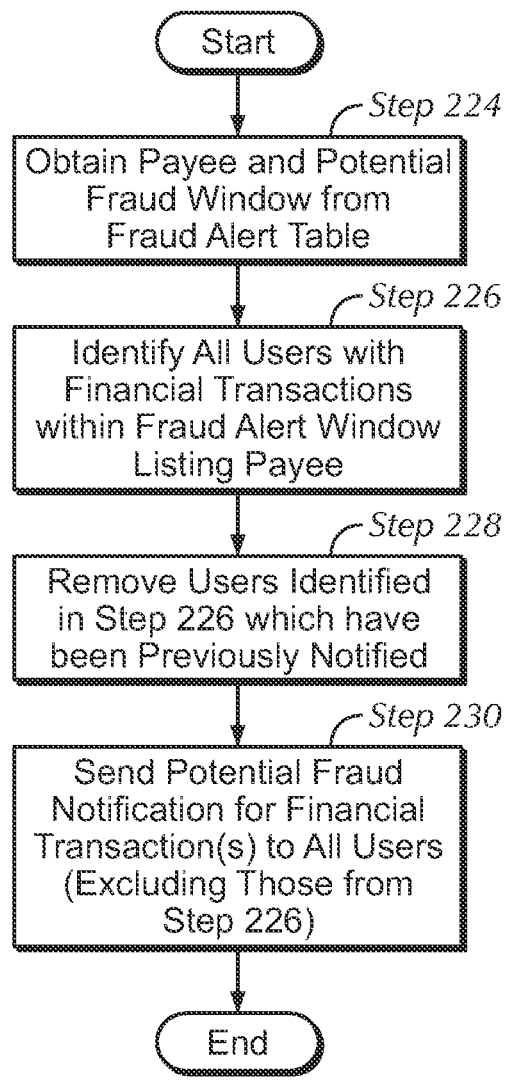

FIGS. 2A-2C show flow charts detailing a method of identifying an origin of fraud in accordance with one or more embodiments of the invention. In one or more embodiments of the invention, one or more of the steps shown in FIGS. 2A-2C may be omitted, repeated, and/or performed in a different order. Accordingly, embodiments of the invention should not be considered limited to the specific arrangement of steps shown in FIGS. 2A-2C.

Turning to FIG. 2A, in Step 202, the fraud detection system receives a notification that a user has marked a fraud flag as "YES" for a particular financial transaction. In one embodiment of the invention, the user may review their financial transaction information using a financial accounting application (e.g., a web-based application provided by a financial institution or an application executing on a client (114A, 114N) which has obtained the financial transaction information for the user from one or more financial institutions). If the user does not recognize being responsible for that particular financial transaction, the user may set the fraud flag to "YES."

In Step 204, the fraud detection system identifies the payee associated with the flagged financial transaction. In Step 206, the fraud detection system updates the fraud aggregation table entry for the identified payee. If the payee is not yet in the fraud aggregation table, the fraud detection engine will add the payee to the table. According to one or more embodiments of the invention, when a user sets a fraud flag to "YES," the fraud score in the fraud aggregation table is increased. In Step 208, the fraud detection engine adds the financial transaction information from the flagged transaction into the financial transaction table.

Turning to FIG. 2B, in Step 210, the fraud detection engine identifies users in the financial transaction table for each financial transaction with a fraud flag set as "YES." In Step 212, the fraud detection engine obtains financial transactions for all users identified in Step 210. According to one or more embodiments of the invention, a user may have financial transaction information associated with one or more accounts, and those accounts may be associated with more than one financial institution. However, persons skilled in the art will appreciate that it may only be necessary to obtain financial transactions associated with the same account as the flagged financial transaction. In Step 214, the fraud detection engine groups financial transactions obtained in Step 212 in per-user sets.

In Step 216, the fraud detection engine determines intersections between the per-user sets by analyzing payee and, optionally, dates of the financial transaction. In one embodiment of the invention, an intersection occurs when two financial transaction entries in two different sets have the same payee. The number of intersections may be limited by only reviewing financial transaction entries for financial transactions that occurred within a specified preceding time period (e.g., within the last 2-months). According to one or more embodiments of the invention, the origin of fraud may not correspond to the payee of the fraudulent financial transaction that the user has flagged; rather, the user's account information may have been stolen during a previous transaction. By determining intersections in users' financial history who have reported fraudulent activity, the fraud detection engine may pinpoint a potential origin of fraud.

In Step 218, the fraud detection engine identifies financial transaction information such as date and payee from all intersection financial transactions in identified in Step 214. In Step 220, the fraud detection engine determines a potential fraud window (i.e., a time span) for the payee. In one embodiment of the invention, a given payee may only be the origin of fraud for a limited time frame (e.g., while a certain individual worked for the payee). Accordingly, a potential fraud window may be specified, which indicates when payee is the potential origin of fraud.

In one or more embodiments of the invention, the fraud detection engine may determine the potential fraud window by reviewing the date distribution of the intersecting financial transactions for a given payee and set the potential fraud window to encompass a majority of the financial transactions. Other methods may be used to determine the potential fraud window. In addition, according to one or more embodiments of the invention, the fraud detection engine may determine that there are multiple potential origins of fraud. This may include multiple payees or multiple potential fraud windows for a single payee. In Step 222, the payee(s) and the potential fraud window(s) are stored in a fraud alert table. According to one or more embodiments of the invention, this fraud alert table is stored in the data store in the fraud detection system.

Turning to FIG. 2C, in Step 224, the fraud detection engine obtains payee and potential fraud window information from the fraud alert table. According to one or more embodiments of the invention, this data identifies a potential origin of fraud, as discussed above. In Step 226, the fraud detection engine identifies a set of users with transactions within the fraud alert window that match the corresponding payee from the fraud alert table. Persons skilled in the art will appreciate that the fraud alert table may identify several time spans for a single payee as a potential origin of fraud, so the payee may appear multiple times in the fraud alert table. Users with matches for each of these entries are identified. In Step 228, users from the set identified in Step 226 who have been previously notified of the potential origin of fraud are removed (or disregarded) as matches.

In Step 230, the fraud detection engine sends potential fraud notifications to the remaining users (i.e., excluding those users from Step 226) in the set regarding the transactions that correspond to the entries in the fraud alert table. Users may be alerted via e-mail, short message service (SMS), or any other means of communication over a network. By performing this notification, users are alerted to closely observe activity on the account associated with the financial transactions that fit an entry in the fraud alert table and may take action as they see appropriate to prevent future fraudulent activity on that account, such as closing an account or avoiding future transactions with the identified payee.

Figure 3:
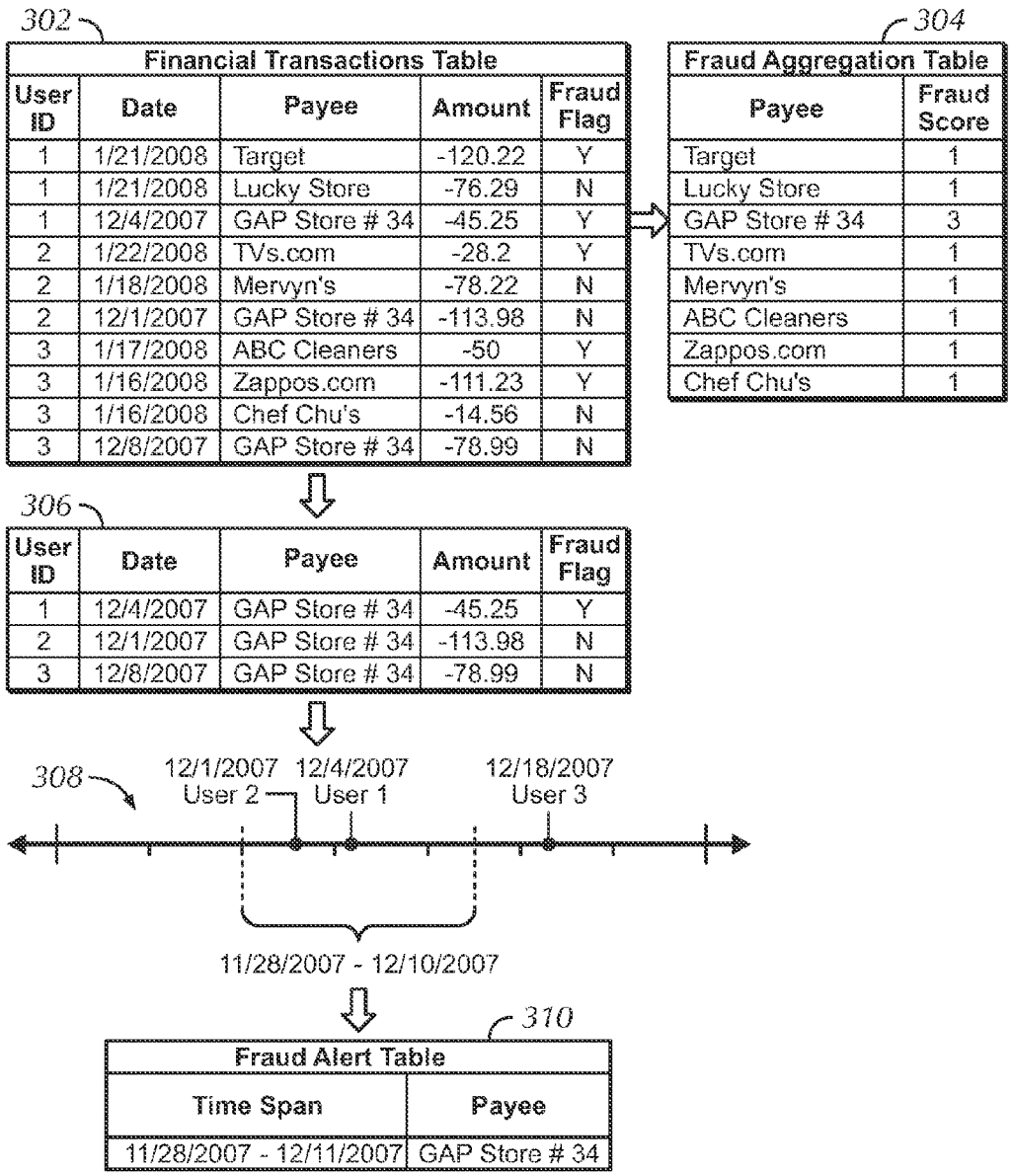
FIG. 3 shows an example of determining an origin of fraud in accordance with one or more embodiments of the invention.

FIG. 3 shows an example of a method for identifying a potential origin of fraud and storing that potential origin of fraud in a fraud aggregation table. This example is not intended to limit the scope of the invention. Turning to the example, consider the scenario in which three users (denoted 1-3) each identify one fraudulent transaction and send this information to the fraud detection system.

Upon receipt of the above information, the fraud detection system stores a financial transaction table (302) entry for each of the fraudulent transactions. Each financial transaction entry in the financial transaction table specifies a date, a payee, and a user. Subsequently, the fraud detection system obtains financial transactions from users 1-3 and stores them in the financial transactions table. Those skilled in the art will appreciate that the financial transaction data may be stored in the financial transaction table in any number of ways and the data as presented in the financial transaction table (302) is presented for purposes of this example.

Once the financial transactions are stored in the financial transaction table, the financial transaction entries within the financial transaction table (302) are used to update the associated entries in a fraud aggregation table (304). More specifically, each financial transaction entry in the financial transaction table in which the Fraud Flag is set to "Y", the payee is payee is identified and the corresponding entry in the fraud aggregation table is updated. For example, user 1 indicated that a financial transaction at Gap Store #34 was fraudulent. Using this information, the fraud score for entry in fraud aggregation table (304) that includes Gap Store #34 is incremented (or otherwise increased).

Returning to the example, as described above, the fraud detection engine determines intersections between financial transaction entries of a set of users who have flagged a transaction as fraudulent. These intersections are based on payee and, optionally date of the financial transaction. These intersections are shown in table 306. As illustrated, user's 1-3, each had previous financial transaction at GAP Store #34, although not all users flagged their respective financial transaction as fraudulent. While each user has a financial transaction associated with the same payee, users 1 and 2 made their transactions at a much closer period of time than with user 3. Considering this, it is more likely that GAP Store #34 was the origin of fraud for users 1 and 2 than for user 3, so a window of time is identified as the potential origin of fraud, as shown by the timeline (308). As shown, the likely window of time for the origin of fraud is identified as 11/28/2007-12/10/2007. It is important to note that because the transaction between user 3 and GAP Store #34 is so far removed from the transactions between users 1 and 2 and GAP Store #34, the transaction is listed on the timeline outside the determined window for the potential origin of fraud. Although the example illustrates a two week window as the identified time span for these intersections, those skilled in the art will appreciate that this window for a potential origin of fraud may be larger or smaller and may be determined using a number of factors, such as the type of payee or the number of times the payee appears for all user financial transactions.

Once the intersection and time span for the potential origin of fraud are identified, the time span and payee are stored in the fraud alert table (310). Subsequently, users 1 and 2 may be notified of the potential origin of fraud. The fraud alert table may be stored and updated as other users' financial transaction information is stored in the financial transaction table.

Figure 4A:
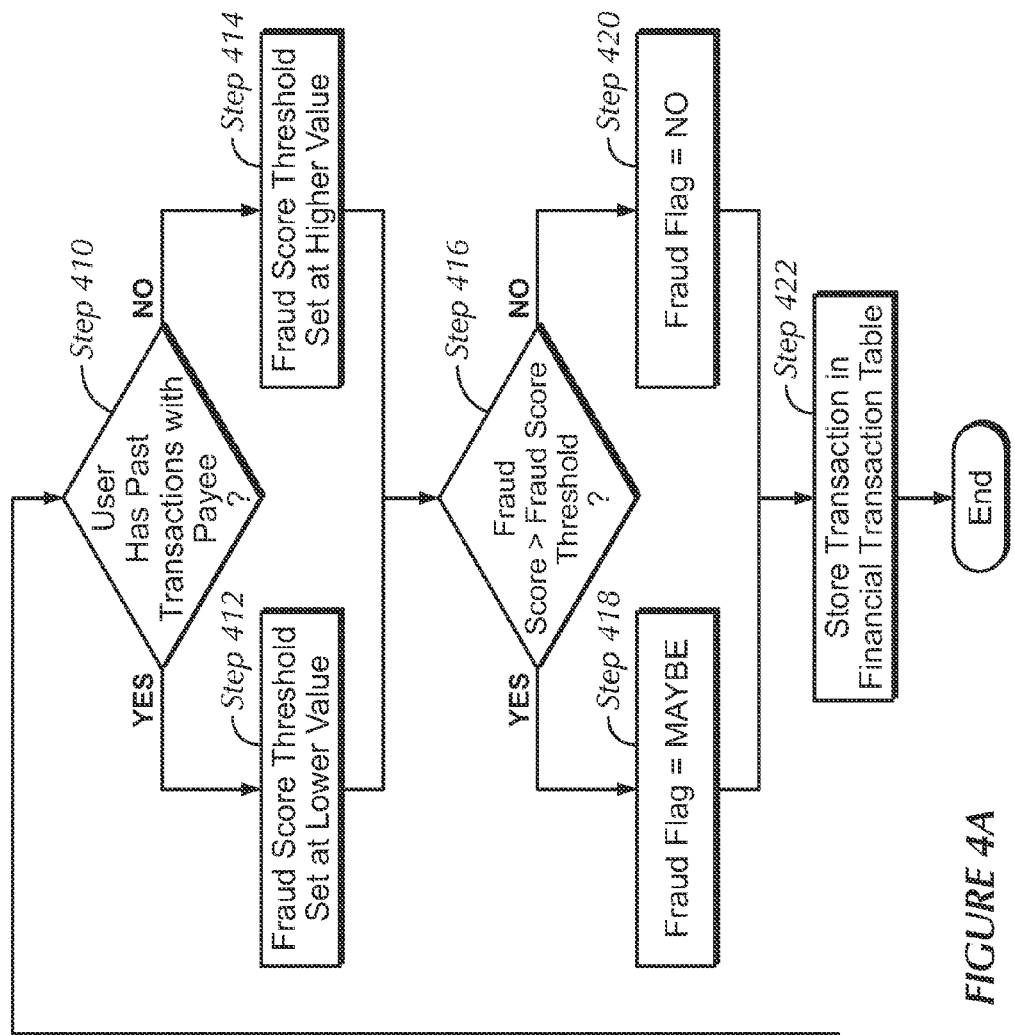
FIGS. 4A-4B show flow charts detailing a method of identifying users who may be impacted by a potential origin of fraud in accordance with one or more embodiments of the invention.
Figure 4A:
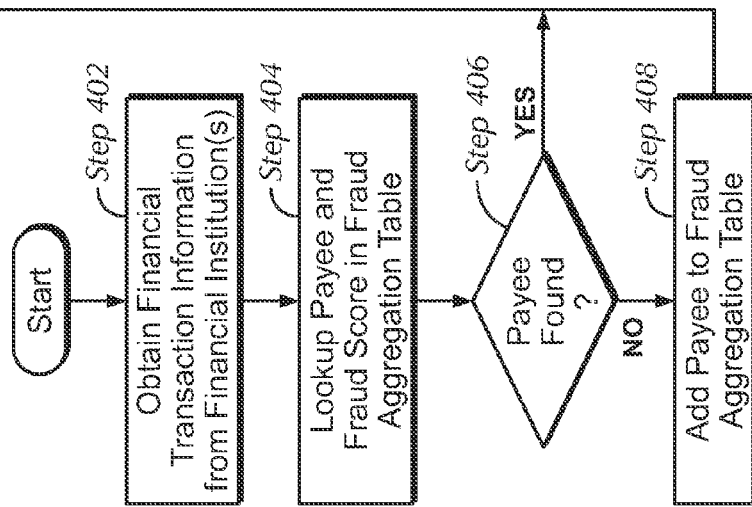
Figure 4B:
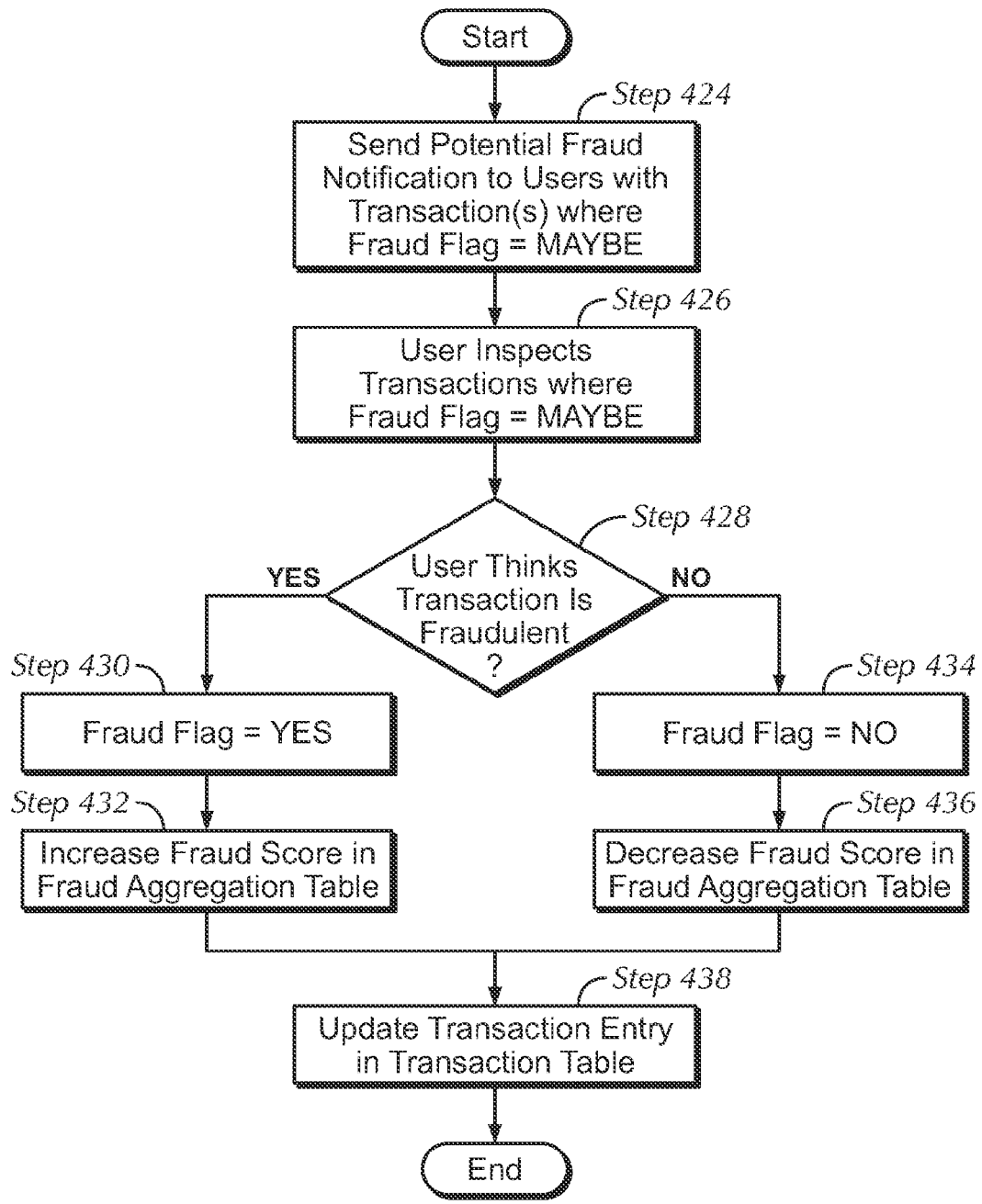

FIGS. 4A-4B show flow charts detailing a method of identifying users who may be impacted by a potential origin of fraud in accordance with one or more embodiments of the invention. In one or more embodiments of the invention, one or more of the steps shown in FIGS. 4A-4B may be omitted, repeated, and/or performed in a different order. Accordingly, embodiments of the invention should not be considered limited to the specific arrangement of steps shown in FIGS. 4A-4B.

Turning to FIG. 4A, in Step 402, financial transaction information for a user is obtained from a financial institution onto the data store and stored in the financial transaction table. In one or more embodiments of the invention, the financial transaction information may be obtained from a number of accounts related to a financial institution. In addition, financial transaction information for the user may be obtained from a number of financial institutions. The financial transaction information is stored as a financial transaction entry in the financial transaction table.

In Step 404, the payee for the financial transaction entry is identified and the fraud score for the identified payee is determined. In one or more embodiments of the invention, the fraud detection engine may look up the fraud score for each payee in the fraud aggregation table.

In Step 406, a determination is made about whether the payee about whether an entry for the payee is present in the fraud aggregation table. In Step 408, when an entry for the payee is not present, an entry for the payee is created and stored in the fraud aggregation table and the process proceeds to Step 410. If an entry for the payee is present in the fraud aggregation table, then the process proceeds to Step 410. In Step 410, the fraud detection engine determines whether the user has had previous financial transactions with the payee (i.e., financial transactions other than the one obtained in Step 402).

In Step 412, when the user has had previous financial transactions associated with the payee, the fraud score threshold is set at a lower level. In Step 414, when the user has not had previous financial transactions with the payee, the fraud score threshold is set at a higher level. The fraud score threshold is used to determine whether the financial transaction obtained in Step 402 is fraudulent. Accordingly, if the user has previous transactions with the payee, it is more likely that the financial transaction obtained in Step 402 is fraudulent. Similarly, if the user has no previous financial transactions with the payee, it is less likely that the financial transaction obtained in Step 402 is fraudulent. In one or more embodiments of the invention, the fraud score threshold may be set and adjusted on a per-payee basis. Further, the threshold for a particular payee may be higher or lower than others depending on a number of considerations, such as whether transactions with a payee are completed online or in person, the volume of transactions associated with the payee, the level of security associated with the payee, etc.

In Step 416, the fraud detection engine determines whether the stored fraud score for the identified payee exceeds the fraud score threshold, as determined in steps 412 and 414. In Step 418, if the fraud score exceeds the fraud score threshold, then the fraud detection engine sets the fraud flag for the financial transaction associated with the payee as "MAYBE." In Step 420, if the fraud score does not exceed the fraud score threshold, the fraud flag for the associated financial transaction is set to "NO." In Step 422, the financial transaction is stored in the financial transaction table.

Those skilled in the art will appreciate that while the method in FIG. 4A describes one embodiment for processing a single financial transaction, the method may be repeated for other financial transactions associated with the user or a group of user. Further, the fraud aggregation table may be updated using financial transaction information from multiple users. Further, Step 402 include obtaining all financial transaction information for a given user or set of users from one or more financial institutions. Once the financial transaction information has been obtained (or while it is being obtained), Steps 404-422 may be applied to the individual financial transactions.

Turning to FIG. 4B, in Step 424, the fraud detection engine sends potential fraud notifications to users with financial transactions where the fraud flag has been set to "MAYBE." In Step 426, the user inspects the flagged financial transaction. In Step 428, if the user believes that the financial transaction is actually fraudulent, then in Step 430 the fraud flag is updated to "YES." In Step 432, the fraud detection engine increases the fraud score for the payee associated with the fraudulent financial transaction in the fraud aggregation table.

In Step 434, if the user does not think the financial transaction is fraudulent, the fraud flag is set to "NO." In Step 436, the fraud detection engine decreases the fraud score associated with the payee accordingly. In Step 438, the financial transaction entry associated with the potential fraud notification is updated in the financial transaction table.

Those skilled in the art will appreciate that the Step 430 may also be used to trigger the method described in FIGS. 2A-2C.

Figure 5:
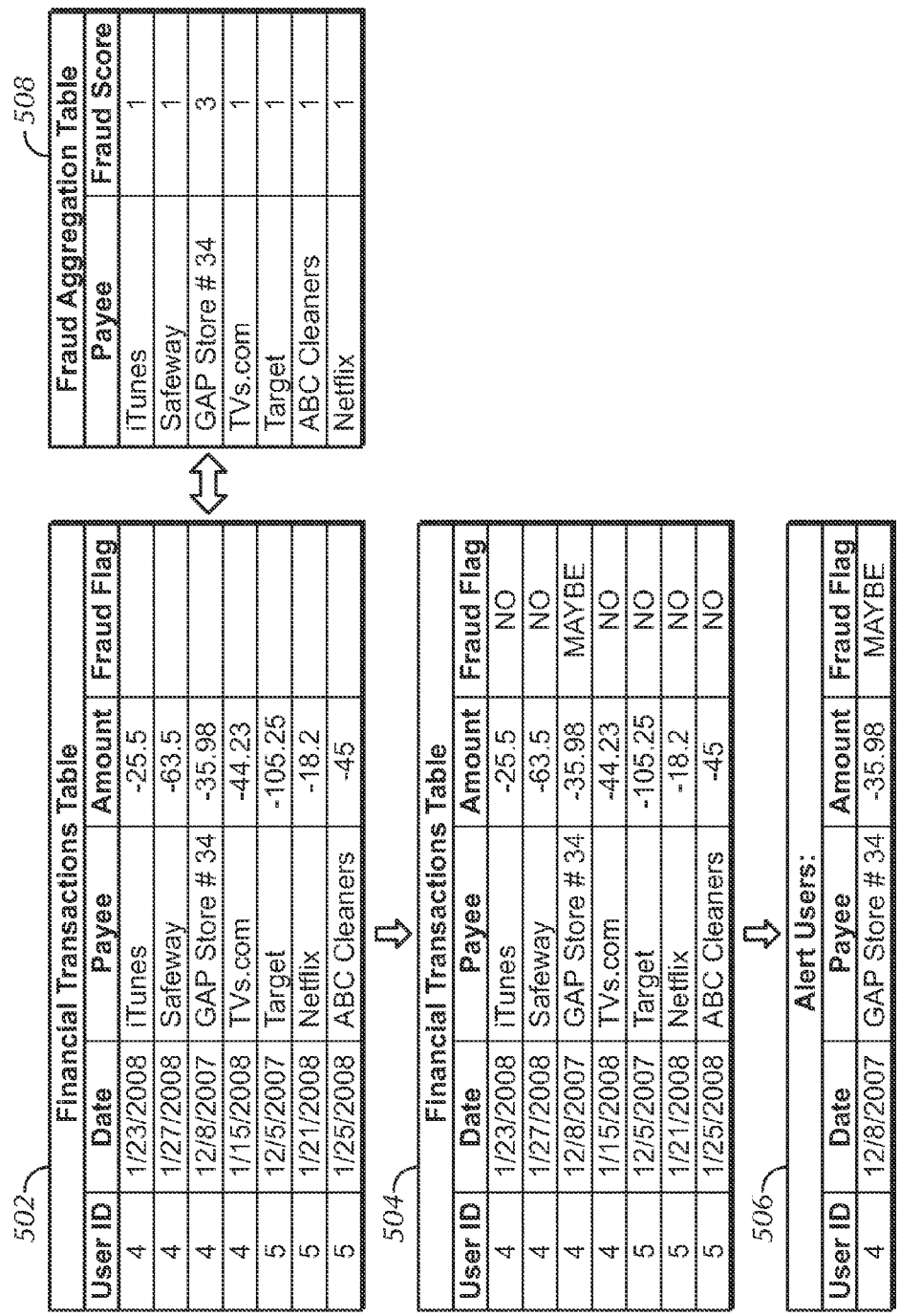
FIG. 5 shows an example of determining which users to alert about a potential origin of fraud in accordance with one or more embodiments of the invention.

FIG. 5 illustrates an example of determining which users need to be alerted of potential fraudulent transactions according to one or more embodiments of the invention. This example is not intended to limit the scope of the invention. Turning to the example, consider the scenario in which financial transactions for users 4 and 5 are obtained and stored in the financial transactions table (502). Using the method described in FIGS. 4A-4B, the financial transactions in the financial transactions table (502) are used to update the content of the fraud aggregation table (508).

Subsequently, as discussed in FIGS. 4A-4B, the fraud score along with the fraud score threshold is used to determine which, if any, financial transaction entries are potentially fraudulent. Table 504 shows an updated version of the downloaded financial transaction entries. For the purposes of this example, assume that the fraud score for GAP Store #34 is greater than the fraud score threshold. Accordingly, the fraud detection engine has marked user 4's financial transaction entry with GAP Store #34 as potentially fraudulent by setting the fraud flag as "MAYBE." In the example, no other financial transaction entries are flagged as "MAYBE" after a comparison of the associated fraud score and fraud score thresholds. It is important to note that while the fraud aggregation table does not store fraud scores based on time spans, the flagged financial transaction entry also falls within the time span identified in the fraud alert table (310 in FIG. 3). According to one or more embodiments of the invention, the fraud detection engine may consider time spans in storing a fraud aggregation table.

Returning to the example, Table 506 shows that the fraud detection engine has evaluated the financial transaction entries in the financial transaction table (502) and has identified the user 4 transaction with GAP Store #34 as the only potentially fraudulent transaction for which a user should be alerted.

User 4 may be alerted about the potentially fraudulent transaction, and will be able to determine whether the financial transaction is fraudulent by setting the fraud flag to "YES" or "NO." Based on the information returned from the user, the financial transaction table and the fraud aggregation table may be updated accordingly.

Figure 6:
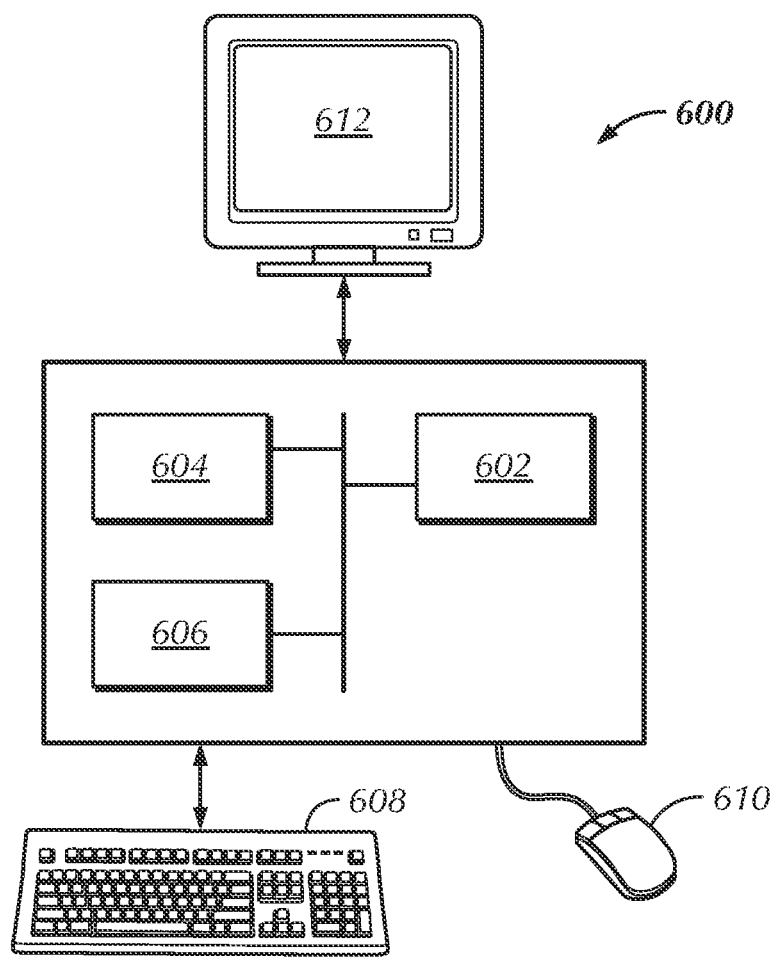
FIG. 6 shows a computer system in accordance with one or more embodiments of the invention.

Embodiments of the invention may be implemented on virtually any type of computer regardless of the platform being used. For example, as shown in FIG. 6, a computer system (600) includes one or more processor(s) (602), associated memory (604) (e.g., random access memory (RAM), cache memory, flash memory, etc.), a storage device (606) (e.g., a hard disk, an optical drive such as a compact disk drive or digital video disk (DVD) drive, a flash memory stick, etc.), and numerous other elements and functionalities typical of today's computers (not shown). The computer (600) may also include input means, such as a keyboard (608), a mouse (610), or a microphone (not shown). Further, the computer (600) may include output means, such as a monitor (612) (e.g., a liquid crystal display (LCD), a plasma display, or cathode ray tube (CRT) monitor). The computer system (600) may be connected to a network (614) (e.g., a local area network (LAN), a wide area network (WAN) such as the Internet, or any other similar type of network) via a network interface connection (not shown). Those skilled in the art will appreciate that many different types of computer systems exist, and the aforementioned input and output means may take other forms. Generally speaking, the computer system (600) includes at least the minimal processing, input, and/or output means necessary to practice embodiments of the invention.

Further, those skilled in the art will appreciate that one or more elements of the aforementioned computer system (600) may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for identifying an origin of fraudulent activity, comprising:
    receiving, from a first user, a first fraud flag identifying a first financial transaction between the first user and a payee as fraudulent, wherein the first user sets the first fraud flag;
    obtaining, by a computer processor, a fraud score for the payee from a fraud aggregation table,
        wherein the fraud score is based on a plurality of fraud flags set by a plurality of users and identifying a plurality of transactions between the plurality of users and the payee as fraudulent, and
        wherein the fraud score is further based on the plurality of fraud flags associated with the payee within a time span;
    obtaining, by the computer processor, a fraud score threshold associated with the payee;
    incrementing, in response to receiving the first fraud flag, the fraud score to obtain an incremented fraud score;
    making a determination that the incremented fraud score exceeds the fraud score threshold;
    retrieving, in response to the determination, a financial transaction entry associated with a second financial transaction between a second user and the payee after the second financial transaction is complete, wherein the financial transaction entry associated with the second financial transaction comprises a date within the time span; and
    alerting the second user, based on the determination, that the payee is a potential origin of fraud after the second financial transaction is complete.

2. The method of claim 1, further comprising:
    identifying, prior to alerting the second user, a previous transaction entry associated with the payee and the second user; and
    decreasing the fraud score threshold in response to identifying the previous transaction entry.

3. The method of claim 1, further comprising:
    determining, prior to alerting the second user, that no previous transaction entry associated with the payee and the second user exists; and
    increasing the fraud score threshold in response to determining that no previous transaction entry associated with the payee and the second user exists.

4. A non-transitory computer readable storage medium comprising executable instructions for performing a method for identifying an origin of fraudulent activity, the method comprising:
    receiving, from a first user, a first fraud flag identifying a first financial transaction between the first user and a payee as fraudulent, wherein the first user sets the first fraud flag;
    obtaining a fraud score for the payee from a fraud aggregation table,
        wherein the fraud score is based on a plurality of fraud flags set by a plurality of users and identifying a plurality of transaction between the plurality of users and the payee as fraudulent, and
        wherein the fraud score is further based on the plurality of fraud flags associated with the payee within a time span;
    obtaining a fraud score threshold associated with the payee;
    incrementing, in response to receiving the first fraud flag, the fraud score to obtain an incremented fraud score;
    making a determination that the incremented fraud score exceeds the fraud score threshold;
    retrieving, in response to the determination, a financial transaction entry associated with a second financial transaction between a second user and the payee after the second financial transaction is complete, wherein the financial transaction entry associated with the second financial transaction comprises a date within the time span; and
    alerting the second user, based on the determination, that the payee is a potential origin of fraud after the second transaction is complete.

5. The non-transitory computer readable storage medium of claim 4, the method further comprising:
    identifying, prior to alerting the second user, a previous transaction entry associated with the payee and the second user; and
    decreasing the fraud score threshold in response to identifying the previous transaction entry.

6. The non-transitory computer readable storage medium of claim 4, the method further comprising:
   determining, prior to alerting the second user, that no previous transaction entry associated with the payee and the second user exists; and
   increasing the fraud score threshold in response to determining that no previous transaction entry associated with the payee and the second user exists.

7. A system for identifying an origin of fraudulent activity, comprising:
   a computer processor;
   a data store storing a financial transaction table comprising a plurality of financial transaction entries and a fraud aggregation table comprising a plurality of fraud scores for a plurality of payees; and
   a fraud detection engine executing on the computer processor and configured to:
      receive, from a first user, a first fraud flag identifying a first financial transaction between the first user and a payee as fraudulent, wherein the first user sets the first fraud flag;
      obtain a fraud score for the payee from the fraud aggregation table,
         wherein the fraud score is based on a plurality of fraud flags set by a plurality of users and identifying a plurality of transactions between the plurality of users and the payee as fraudulent, and
         wherein the fraud score is further based on the plurality of fraud flags associated with the payee within a time span;
      obtain a fraud score threshold associated with the payee;
      increment, in response to receiving the first fraud flag, the fraud score to obtain an incremented fraud score;
      make a determination that the incremented fraud score exceeds the fraud score threshold;
      retrieve, from the financial transaction table and in response to the determination, a financial transaction entry associated with a second financial transaction between a second user and the payee after the second financial transaction is complete, wherein the financial transaction entry associated with the second financial transaction comprises a date within the time span; and
      alert the second user, based on the determination, that the payee is a potential origin of fraud after the second financial transaction is complete.

8. The system of claim 7, wherein the fraud detection engine is further configured to:
   identify, prior to alerting the second user, a previous transaction entry associated with the payee and the second user; and
   decrease the fraud score threshold in response to identifying the previous transaction entry.

9. The system of claim 7, wherein the fraud detection engine is further configured to:
   determine, prior to alerting the second user, that no previous transaction entry associated with the payee and the second user exists; and
   increase the fraud score threshold in response to determining that no previous transaction entry associated with the payee and the second user exists.

* * * * *